(12) United States Patent
Walsh et al.

(10) Patent No.: US 7,409,874 B2
(45) Date of Patent: Aug. 12, 2008

(54) METERING APPARATUS FOR FUEL INJECTOR FLOW TEST

(75) Inventors: Aaron Walsh, West Hunsbury (GB); Ronald Michael Bundock, Buckingham (GB)

(73) Assignee: Hartridge Limited, Buckinghamshire (GB)

( * ) Notice: Subject to any disclaimer, the term of this patent is extended or adjusted under 35 U.S.C. 154(b) by 0 days.

(21) Appl. No.: 11/221,742

(22) Filed: Sep. 9, 2005

(65) Prior Publication Data

US 2006/0053900 A1 Mar. 16, 2006

(30) Foreign Application Priority Data

Sep. 10, 2004 (GB) ................... 0420181.0

(51) Int. Cl.
*G01F 1/34* (2006.01)
(52) U.S. Cl. .................................. 73/861.42
(58) Field of Classification Search ............ 73/299, 73/700, 290, 861.42
See application file for complete search history.

(56) References Cited

U.S. PATENT DOCUMENTS

| | | | | |
|---|---|---|---|---|
| 5,544,786 A | * | 8/1996 | Gamilis et al. | 222/59 |
| 5,553,490 A | * | 9/1996 | Nicholls et al. | 73/119 A |
| 5,802,910 A | * | 9/1998 | Krahn et al. | 73/299 |
| 6,845,663 B2 | * | 1/2005 | Lopatin et al. | 73/290 V |
| 6,889,547 B1 | * | 5/2005 | Taylor | 73/291 |
| 7,131,451 B2 | * | 11/2006 | Nugent et al. | 137/12 |

* cited by examiner

*Primary Examiner*—Andre J Allen
(74) *Attorney, Agent, or Firm*—Clark & Brody (57) ABSTRACT

Metering apparatus including wall portions which define an elongate generally upright cavity of substantially uniform cross-section and an inlet to the cavity to enable fluid which is to be metered to be fed into the cavity. The apparatus further includes a pressure transducer in communication with fluid in the cavity when the apparatus is in use, to provide a signal indicative of the amount of fluid in the cavity above the transducer.

33 Claims, 10 Drawing Sheets

METERING APPARATUS FOR FUEL INJECTOR FLOW TEST

TECHNICAL FIELD

This invention relates to the art of measuring fluids, particularly fluids from fuel injectors being tested.

BACKGROUND ART

The present invention relates to metering apparatus comprising wall portions which define an elongate generally upright cavity of substantially uniform cross-section and an inlet to the cavity to enable fluid which is to be metered to be fed into the cavity.

Such apparatus which has previously been proposed comprises graduated glass tubular columns into which test oil is fed from an injector pump under test via an injector. Readings can be taken after a known number of injections to provide a mean value of the amount of fluid passing through the injector with each injection.

Apart from the inherent inaccuracy of such apparatus resulting from parallax errors in attempting to read the level of the meniscus of the test oil in a column, the apparatus does not lend itself to providing a digital readout, such as can be readily processed by a computer.

The present invention seeks to provide a remedy.

SUMMARY OF THE INVENTION

Accordingly, the present invention is directed to metering apparatus as set out in the opening paragraph of the present specification characterised by a pressure transducer which is in communication with fluid in the cavity when the apparatus is in use, to provide a signal which is indicative of the amount of fluid in the cavity above the transducer.

Such apparatus benefits from very low back pressure.

Preferably, the wall portions are provided by a tubular column. This is a readily available and relatively easily made construction having the required substantially uniform cross-section. The column may be made of glass, or steel, for example stainless steel or any other suitable material.

Such apparatus can be customised to any flow rate of fluid feed into the cavity by appropriate replacement of the columns to ones having different cross-sectional areas and different heights.

Preferably, the output from the transducer is connected to a calculator which converts the output from the pressure transducer to a value indicative of the volume of fluid above the transducer. This provides a reading which is more readily recognised in accordance with industry standards.

It is desirable to have the transducer in communication with the base of the cavity. This makes use of substantially the whole of the volume of the cavity, and facilitates a relatively easy draining procedure whilst minimising dead space in the cavity which would need to be filled after a drain before a reading could be taken.

In one preferred embodiment of the present invention, a temperature measuring device is provided so as to be in communication with the fluid in the cavity when the apparatus is in use. This enables corrections to be made, for example to take account of changes in viscosity with temperature that will effect the rate of flow of fluid which wets the cavity wall portions after a drain of the cavity.

It is desirable to have the temperature measuring device connected to the calculator to enable such a correction to be made. Such a calculator is preferably programmed to allow for an exponentially decaying rate of flow down the cavity wall portions owing to fluid which has wetted those portions.

Preferably, a calculator is provided in any case at least to convert the signal from the pressure transducer to one which is indicative of the volume of fluid in the cavity required to give such a reading with the temperature of the fluid being 40° C. This enables a reading to be provided in accordance with industry standards.

The temperature measuring device may most effectively be a thermistor or a thermocouple.

Preferably, the inlet is at the base of the cavity. This reduces the time it takes for the volume of fluid injected to be indicated by the pressure transducer.

Preferably, the cavity is provided with an outlet and the outlet is provided with a drain valve to enable fluid to be drained from the cavity.

It is desirable to have the outlet arranged at the base of the cavity to enable substantially the whole of the cavity to be drained of fluid.

The apparatus is most effective as fuel injector test apparatus having at least one output line of an injector pump connected to feed fluid to the cavity via a fuel injector.

The metering apparatus may measure the output of fluid from the nozzle of the or each injector, or it may be used to measure the bypass output from the injector. Respective metering apparatus may be provided for the nozzle output and the bypass output.

The metering apparatus may have a separate cavity for each line of the injection pump which is to be tested.

Respective drain valves for the cavities may also be provided, although it is possible, where accuracy is less important, to have more than one cavity sharing a drain valve.

The calculator may be provided with a measure of the height of the fluid in the cavity immediately prior to a drain, as well as the time taken between a drain and a given reading, as well as the temperature indicated by the temperature measuring device, to provide a correction for wetted walls. This allows for correction for the fluid remaining on the walls influenced by the temperature dependent viscosity of the fluid, as well as the wall area which has been wetted and the time allowed for fluid to flow downwardly along the wetted walls.

A delay device may be provided to ensure a steady state is reached after a drain before readings are taken. For example, the delay device may count the number of injections that have been made since the last drain, or, alternatively, the device may ensure a fixed time delay after a drain before readings are commenced.

Preferably, memory means are included as part of the apparatus to maintain a tally of readings taken over a given period. The apparatus may also include averaging means to provide a measure of the average injected volume over a set of injections, for example one hundred injections. The apparatus may also be provided with display apparatus connected to display the readings taken, for example in the form of histograms and/or numerical indications.

The calculator and/or the memory and/or the display apparatus may be provided by a readily available computer, such as a PC.

The apparatus may be provided with collector means to enable the collection of fluid from the cavity or the cavities when it or they are drained, to facilitate a gravimetric calibration of the apparatus.

The pressure transducer may be coupled to a separate cavity which does not empty when the said generally upright cavity is drained. This ensures that the pressure transducer is always wetted, and is not rendered inaccurate by contact with air.

BRIEF DESCRIPTION OF THE DRAWINGS

Examples of apparatus embodying the present invention will now be described with reference to the accompanying drawings, in which.

DETAILED DESCRIPTION OF THE PREFERRED EMBODIMENTS

Figure 1:
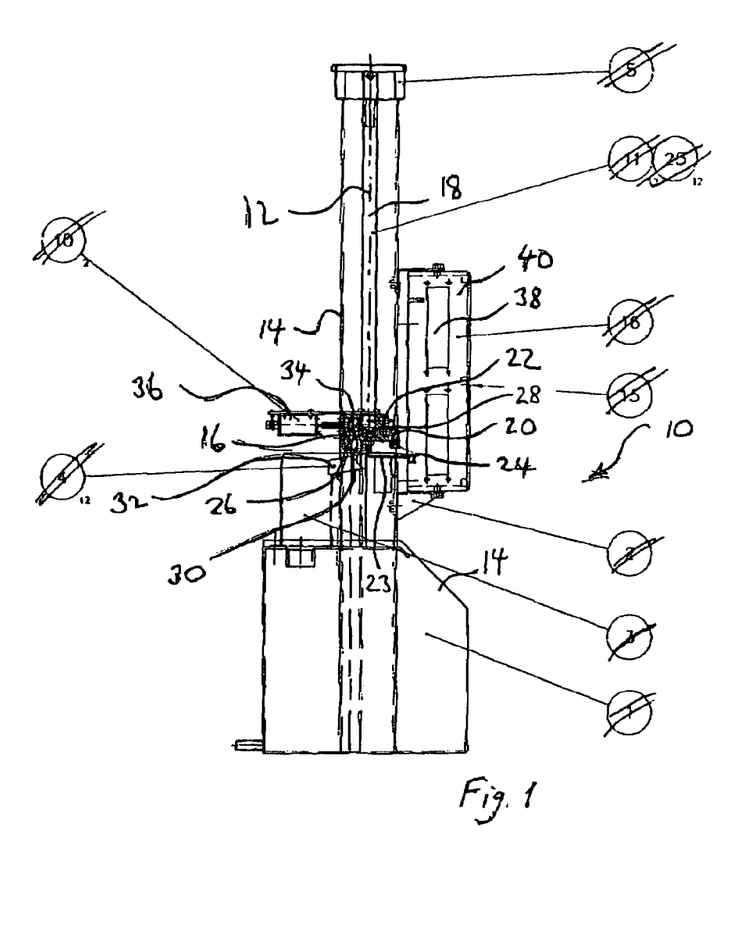
FIG. 1 is a side elevational part-sectional view of metering apparatus embodying the present invention.
Figure 2:
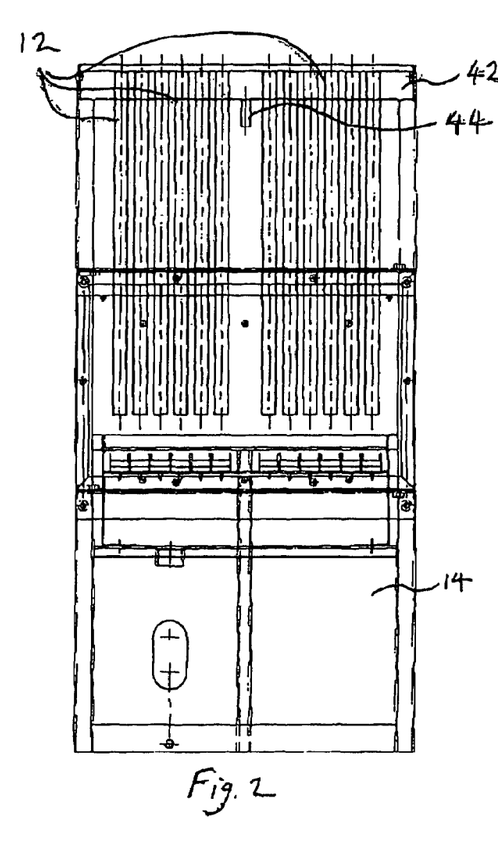
FIG. 2 is a front elevational view of the apparatus shown in FIG. 1 with parts removed for the sake of clarity.
Figure 3:
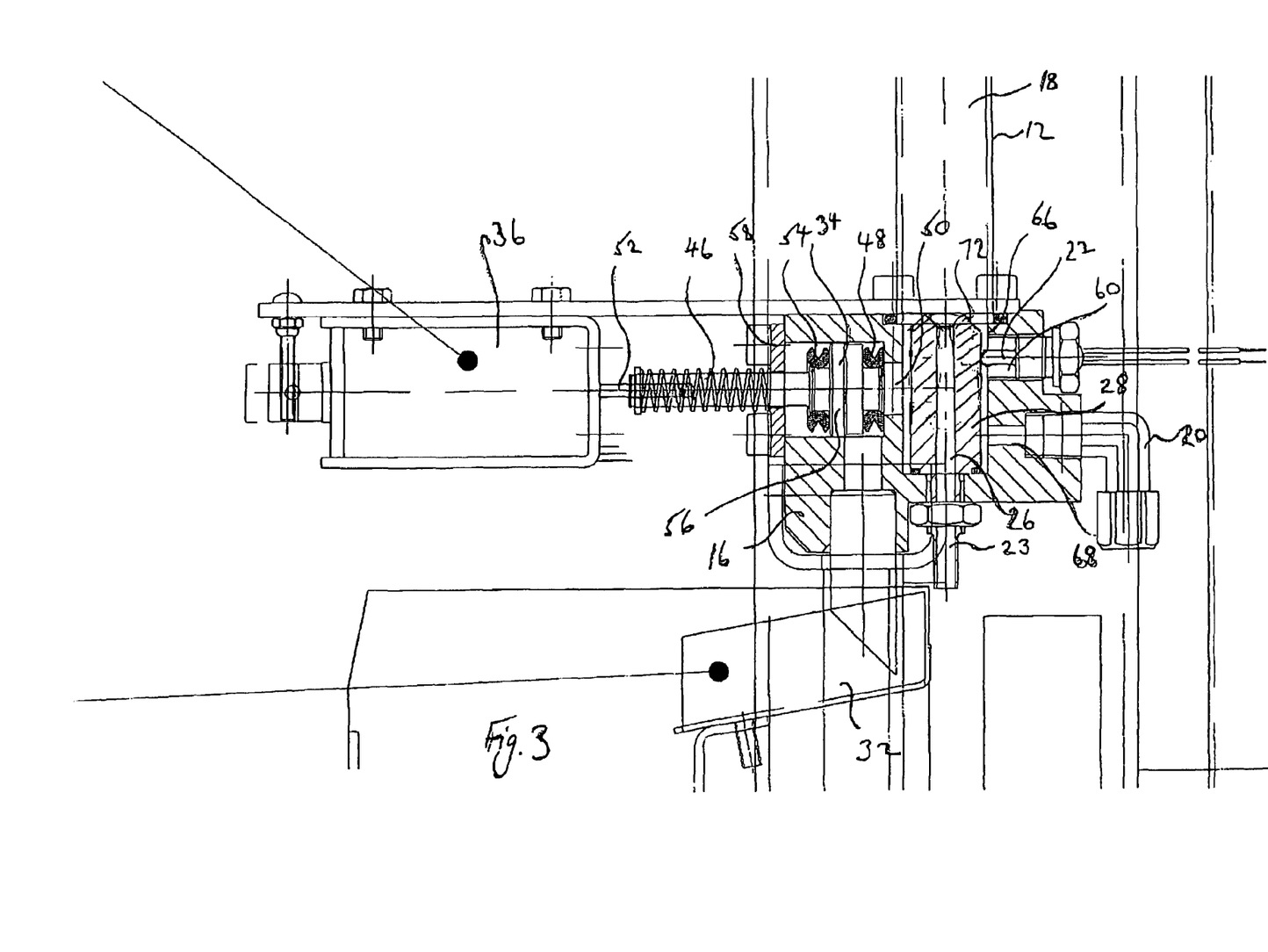
FIG. 3 is an axial sectional diagrammatic view of parts of the apparatus shown in FIG. 1.

The metering apparatus 10 shown in FIGS. 1 to 3 comprises a plurality of parallel upright tubular glass columns 12 arranged alongside one another in a generally planar configuration, the columns being divided into two groups of six with a larger space between the groups than between adjacent columns of each group. In this case, the apparatus is suitable for testing the injection pump of a diesel engine designed to power a heavy vehicle or plant. Clearly, a different number of cylinders could be provided to test the injector of an engine having a different number of cylinders, and even one column would be useful.

The columns 12 are supported by a frame 14 as are other components of the apparatus now to be described. The base of each column 12 is supported in a block 16. Thus, each column 12 defines by its wall portions an elongate generally upright cavity 18 of substantially uniform cross-section extending upwardly from its associated block 16. Each block 16 itself is provided with a number of bores and cavities to accommodate a fluid inlet pipe 20 which is in communication with the cavity 18, a thermistor 22 which is also in communication with fluid in the cavity 18, a pressure transducer pipe 23 which is in communication with the fluid in the cavity 18 via a further cavity 26 defined by an inner block 28 which is within the block 16, the pipe 23 being in communication with a board-mounted pressure transducer 24, and an outlet 30 from the cavity 18 leading to a chute 32 via a solenoid valve 34 operated by a solenoid 36.

The chutes 32 enable drained test oil from the columns 12 to be collected, and either returned to a reservoir (not shown) for recycling or used in a gravimetric calibration of the apparatus.

The pressure transducer 24 is provided to give an indication of the amount of fluid in the cavity 18 of the column 12 which is above it.

Electrical connections (not shown in FIG. 1) are made between a printed circuit board 38 in a housing 40 on the one hand and the thermistor 22, the pressure transducer 24 and the drain valve solenoid 36 on the other. The upper ends of the columns 24 project upwardly into a common overflow tray 42 downwardly from the bottom of which extends a drain outlet 44.

The construction of the block 16 and the parts secured therein can be seen more readily in FIG. 3. More especially, it can be seen that the solenoid 36 is connected to a valve 34 via a direct link helical compression spring 46 to retract the valve.

The valve 34, as shown in FIG. 3, is closed with an O-ring seal 48 which is closest to the base of the column 12 urged against and surrounding a generally circular aperture 50 in the block 16 constituting part of the outlet from the cavity 18. This is the position of the valve 34 when the solenoid 36 is energised with a projecting arm 52 thereof in its extended position. In the event that the solenoid 36 is de-energised, the arm 52 is automatically retracted so that a second O-ring 54 of the seal 34 on the opposite side of a flange 56 thereof to that of the seal 48, is urged against a wall 58 which is sealed against the block 16 and surrounds the arm 52 at a position beyond the spring 46. With the arm 52 in a retracted position, the outlet portion of the outlet part aperture 50 is in fluid communication with the chute 32 to enable any fluid in the column 12 to pass out through the aperture 50 down into the chute 32 and returned for example to a reservoir (not shown) for further use.

It can be seen from FIG. 3 that the thermistor 22 is recessed in a bore 60 formed in the block 16, the bore 60 being in fluid communication with the cavity 18 of the column 12. The pressure transducer 24 is in communication with the auxiliary cavity in the form of a bore 26 which extends axially along the same axis as that of the column 12 and which is defined by a bore through the inner block 28 which itself is within a generally axial central bore 66 through the block 16 with clearance between the cylindrical outer walls of the inner block 28 and the cylindrical inner walls defining the bore 66 of the block 16.

A further bore 68 extends through the block 16 and opens into the axial bore 66 perpendicular thereto at a position facing the inner block 28 and into the clearance between that inner block 28 and the outer block 16, so that the bore 68 is in communication with the cavity 18 of the column 12. This bore 68 constitutes an inlet to the cavity 18. The inlet connector pipe 20 facilitates connection of a feed line from an injector of a fluid injection pump to the bore 68 and thence to the cavity 18.

The upper end 72 of the inner block 28 is chamfered, and the bore 26 through the inner block 28 flares at its upper end. As a result, although fluid may be drained completely from the cavity 18 by the opening of the valve 34, fluid remains trapped in the bore 26 to ensure that the pressure transducer 24 is always in communication with fluid, in this case test oil, and does not suffer inaccuracy by being exposed to air.

Figure 4:
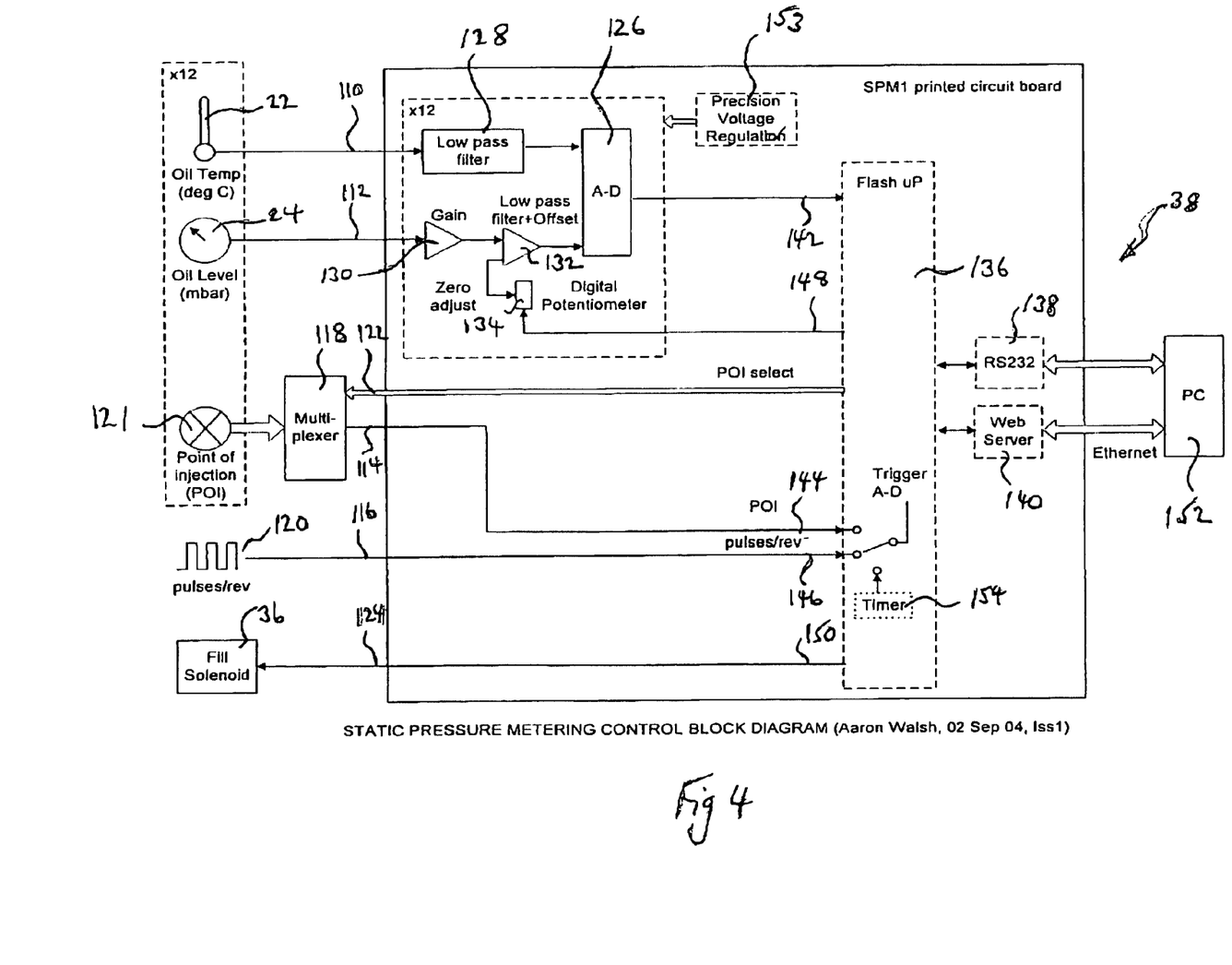
FIG. 4 is a circuit diagram of the electrical circuitry of the apparatus shown in FIGS. 1 to 3.

FIG. 4 shows the electrical circuitry of the apparatus shown in FIGS. 1 to 3. It comprises the printed circuit board 38 having inputs 110, 112, 114, 116 to which are connected the thermistor 22, the pressure transducer 24, a multiplexer 118 and a signal generator 120 which outputs a given number of pulses per revolution of the shaft of an injection pump (not shown) under test.

The multiplexer 118 receives signals from a point of injection output 121 of the apparatus. This is taken from a signal generator (not shown) such as a piezoelectric crystal positioned to provide a pulse at each point of injection (POI). This is a useful instant, because at that moment shock waves from the injection will not have disturbed the fluid in the associated cavity, whilst the disturbance from the immediately preceding injection will have died away, thus reducing any errors from fluid disturbance. The multiplexer enables all of the point of injection signals to be passed to the printed circuit board 38, or alternatively only the points of injection of selected lines of the injector pump.

The printed circuit board 38 has two outputs 122 and 124 connected respectively to the multiplexer 118 and to the solenoid 36 of the drain valve 34.

The output 122 connected to the multiplexer 118 enables signals from the printed circuit board 38 to select which lines have their points of injection passed to the printed circuit board 38.

The signal received at the input 110 is fed to an analogue to digital converter 126 via a low pass filter 128.

The input 112 is connected to a main amplifier 130, the output of which is connected to one of the inputs of a differential amplifier 132 and which acts as a low pass filter and as an offset. The other input thereof is connected to a zero adjust potentiometer 134. The output from the differential amplifier 132 is fed to the analogue to digital converter 126.

The printed circuit board 38 is provided with a main microprocessor 136 provided with an RS 232 interface 138 and a web server 140. The microprocessor 136 has inputs 142, 144 and 146 connected to receive signals respectively from the analogue to digital converter 126, the multiplexer 118 via the input 114, and the pulses from the revolution signal generator 120 via the input 116, respectively. The microprocessor 136 has outputs 148 and 150 connected respectively to the digital potentiometer 134 on the one hand and to the solenoid 136 via the output 124. A PC microcomputer 152 is connected via a network connection to the RS232 138 and the web server 140. The PC may be programmed to provide the display already referred to herein. It will be appreciated that the microprocessor 136 receives connections from each and every column 12 and is connected to energise and de-energise each and every solenoid 36 for the different lines which are being monitored. There is a sub-circuit comprising an analogue to digital converter 126 with associated low pass filter 128, amplifiers 130 and 132, and digital potentiometer 134 for each column 12, and each sub-circuit is provided with a precision voltage regulator 153 to ensure accuracy of readings taken.

The microprocessor 136 is also provided with a timer 154 and analogue to digital converter trigger interrupt of the microprocessor 136 is connected via a three-way switch to the timer 154 or one of the inputs 114 and 116.

Operation of the apparatus and circuitry shown in FIGS. 1 to 4 will now be described with reference to the program and routines shown in FIGS. 5 to 8.

Figure 5:
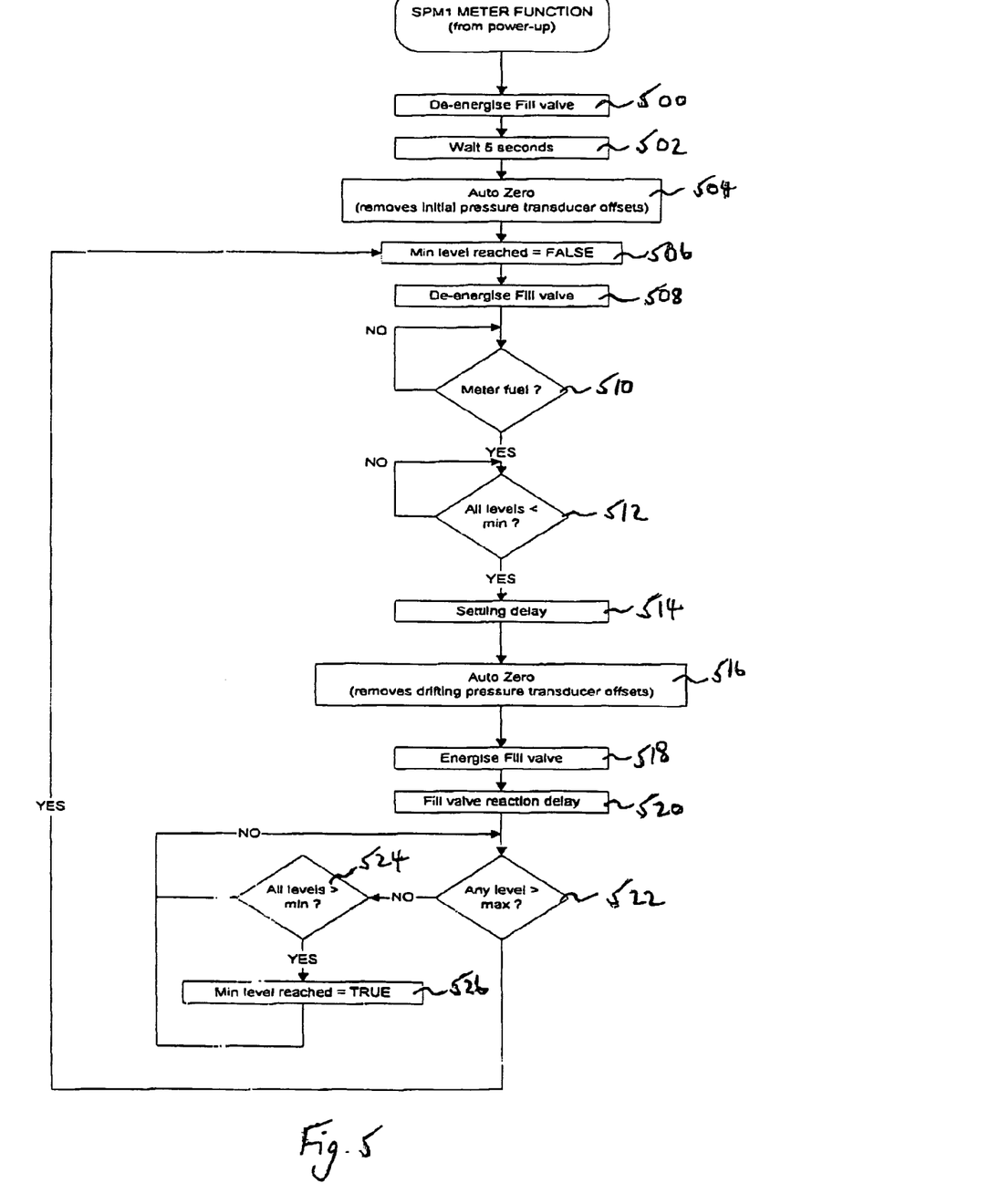
FIG. 5 is a flow diagram of a metering program in accordance with which the circuitry shown in FIG. 4 operates.

FIG. 5 shows the a drain and fill program. From power up an initializing procedure involves de-energising each and every solenoid 36 at step 500. With reference to FIG. 3, this causes retraction of the arm 52 of the solenoid 36 and opening of the valve 34 so that any fluid in the cavity 18 may drain through the aperture 50 and into the chute 32.

A period of, for example, five seconds is counted by the microprocessor 136 at step 502 whereafter the initial pressure transducer offsets by the digital potentiometers 134 are removed at step 504. That period can be readily changed if required to improve accuracy. At step 506, a minimum level read flag is set at false. A further de-energised command in relation to the solenoid 36 is issued at step 508 to be effective after the main loop of the program shown in FIG. 5 has been completed. At step 510, the program in accordance with which the microprocessor 136 is operated determines whether the apparatus has been switched to meter the flow of test oil from an injector pump under test by way of a control console (not shown). If no such command has been issued, the program is simply looped back to reiterate the query. Once it is noted that a metering command has been issued, the program passes to step 512 where it queries whether all fluid levels in the various columns 12 are below a predetermined level indicating that they are empty. If they are not, the program loops back to reiterate the query at 512. Ultimately, since the drain valves are all open, the query will reveal that all the columns 12 are empty, whereupon the program will pass to step 514 where a delay period occurs to allow settling of the test oil. Then at the next step 516, the digital potentiometer 134 is again zeroed. The program then continues with step 518 in which the solenoid 36 is energised to close the valve 34 so that fluid passing in through the inlet 68 now starts to fill the cavity 18 of each and every column 12. At the next step 520, a delay is built in to allow the valve 34 to respond.

There next follows in the program a query 522 to check whether any of the levels of test oil in the column 12 exceeds a predetermined maximum value. If the answer is 'no', then the query is raised to step 524 whether all the levels have exceeded a predetermined minimum value sufficient to give significant readings. If the answer to that query is 'no', the program recycles to repeat the query at 522 as to whether any of the levels of test fluid in the columns 12 has exceeded the predetermined maximum level. Ultimately, bearing in mind the solenoids 36 have been switched to cause the cavity 18 to fill, the answer to the query 524 whether all levels exceeded a predetermined minimum will be 'yes', whereupon the query that the minimum level has been reached is set to 'true' at step 526. As time proceeds, since all the cavities 16 at the column 12 are filling, at least one of the fluid levels will eventually exceed the predetermined maximum level. At this point, the program loops back to step 506 where the query indicating whether the minimum level has been reached for all the columns 12 be set to 'false' and the program is repeated from there. More especially, draining occurs at step 508.

The manner in which successive readings in the analogue to digital converter 126 are taken up by the microprocessor 136 may be selected from three options. These three options are indicated in FIG. 4 on the microprocessor box 136. A first option is to take readings for every point of injection, either for several lines or for lines selected via the microprocessor 136 and the multiplexer 118. The second option is to take readings at the instants determined by the pulse generator 120, for which there are two sub-options, option 2(*a*) effecting a reading at completion of every rotation of the main injection pump shaft, and option 2(*b*) effecting a reading from a pulse, which, as determined by a memorised pulse count, corresponds to a point of injection. The third option is to take readings with a uniform time spacing between successive readings as determined by the timer 154.

Figure 6:
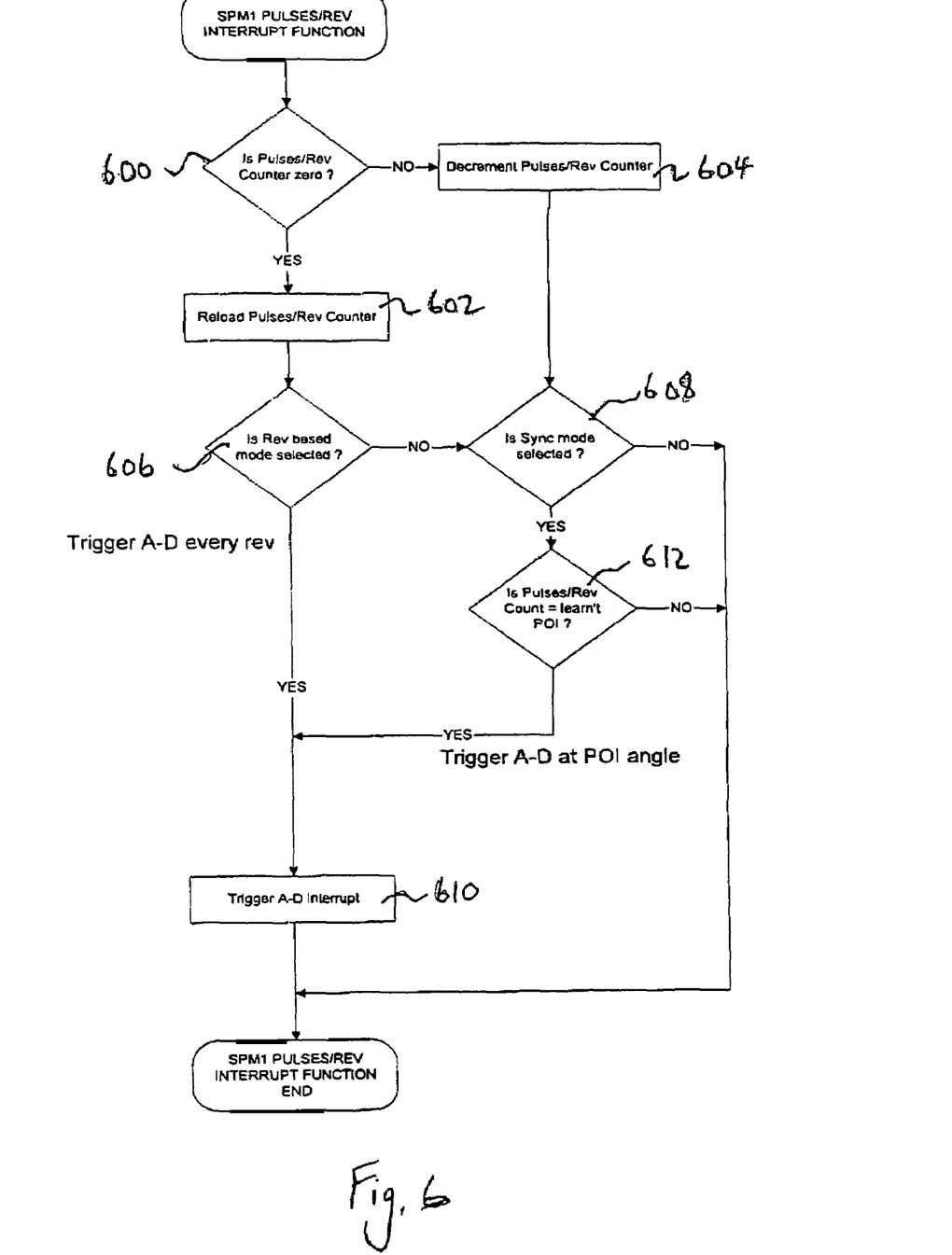
FIGS. 6 to 8 show respective flow charts of sub-routines of the program by which circuitry shown in FIG. 4 operates.

The sub-routine by which the microprocessor 136 is programmed to operate to execute the second option is shown in FIG. 6. This sub-routine commences every time a pulse from the signal generator 120 is received by the microprocessor 136. It starts with a query at step 600 as to whether or not a pulse count of the microprocessor 136 reads zero. If it does, the program passes to step 602 in which the count is reloaded with the number of pulses per revolution of the injector pump shaft generated by the pulse generator 120. If the pulse count is not zero at step 600, step 602 is bypassed via step 604 in which the count is decremented. At the next step 606 after step 602, the query is raised whether the revolution based mode (option 2a) has indeed been selected. If not, the query is raised at step 608 as to whether or not a synchronous mode (option 2b), to check the readings at every count which corresponds to a point of injection, has been selected. If it has not, the sub-routine is ended. If it has, a query is raised at step 612 as to whether the count in the pulse counter is at a memorised point of injection. If so, the analogue to digital converter interrupt is triggered; if not, the sub-routine ends. Finally, it can be seen that if at step 606, the revolution based mode (option 2a) is selected, the program passes to step 610 to cause interruption of other operation of the microprocessor 136 and cause it to accept readings from the analogue to digital converter 126.

Figure 7:
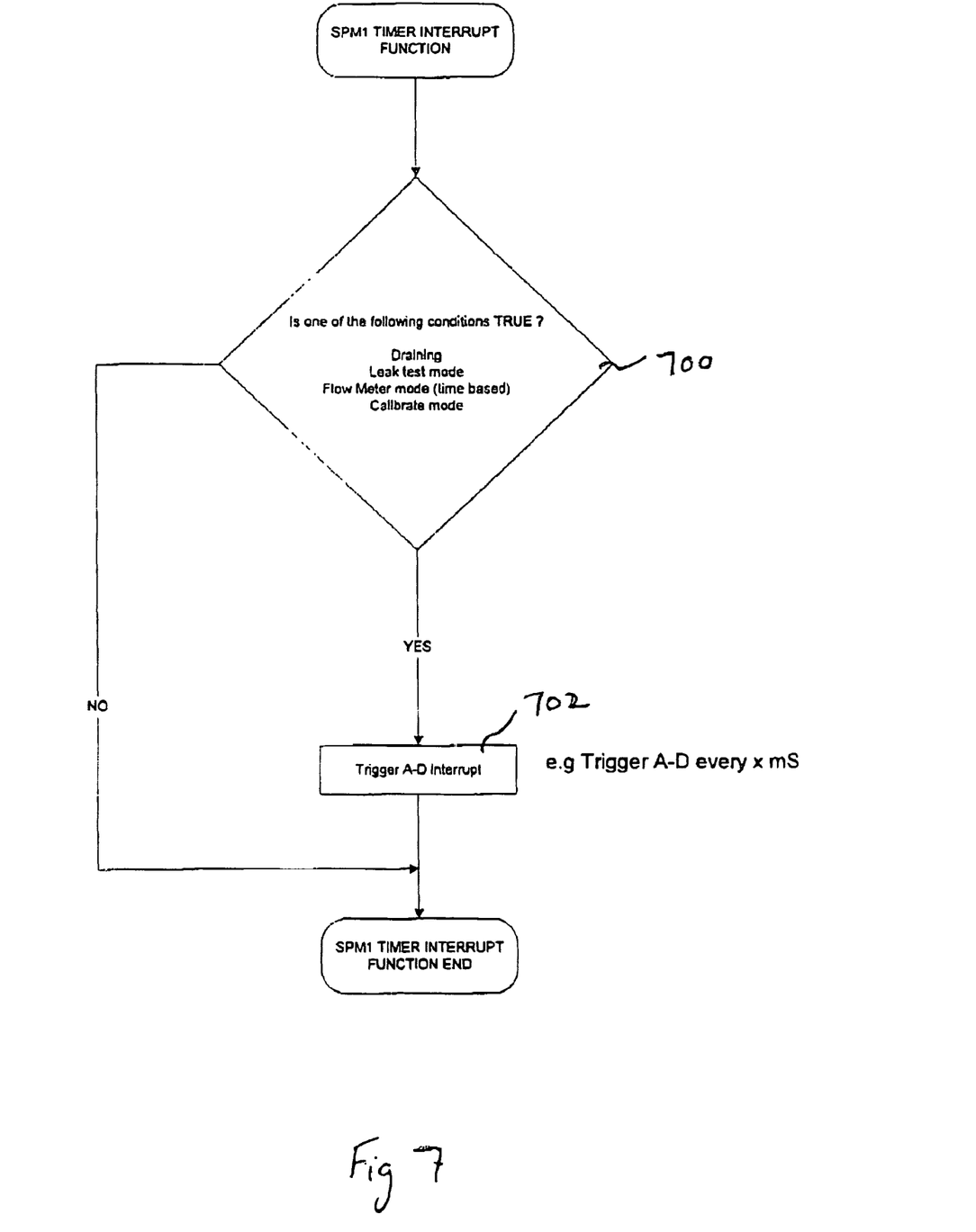

In the sub-routine shown in FIG. 7, which is triggered every time a pulse is issued from the timer 154, and is effective with the aforementioned option 3, the query is raised whether draining, leak tester mode, time base flowmeter mode, or calibration mode is being effected at step 700. If so, the triggering of the analogue to digital converter interrupt occurs at step 702; otherwise the sub-routine ends.

A corresponding subroutine exists for option 1, which is triggered every time a pulse is received by the microprocessor 136 from the multiplexer 118.

Figure 8:
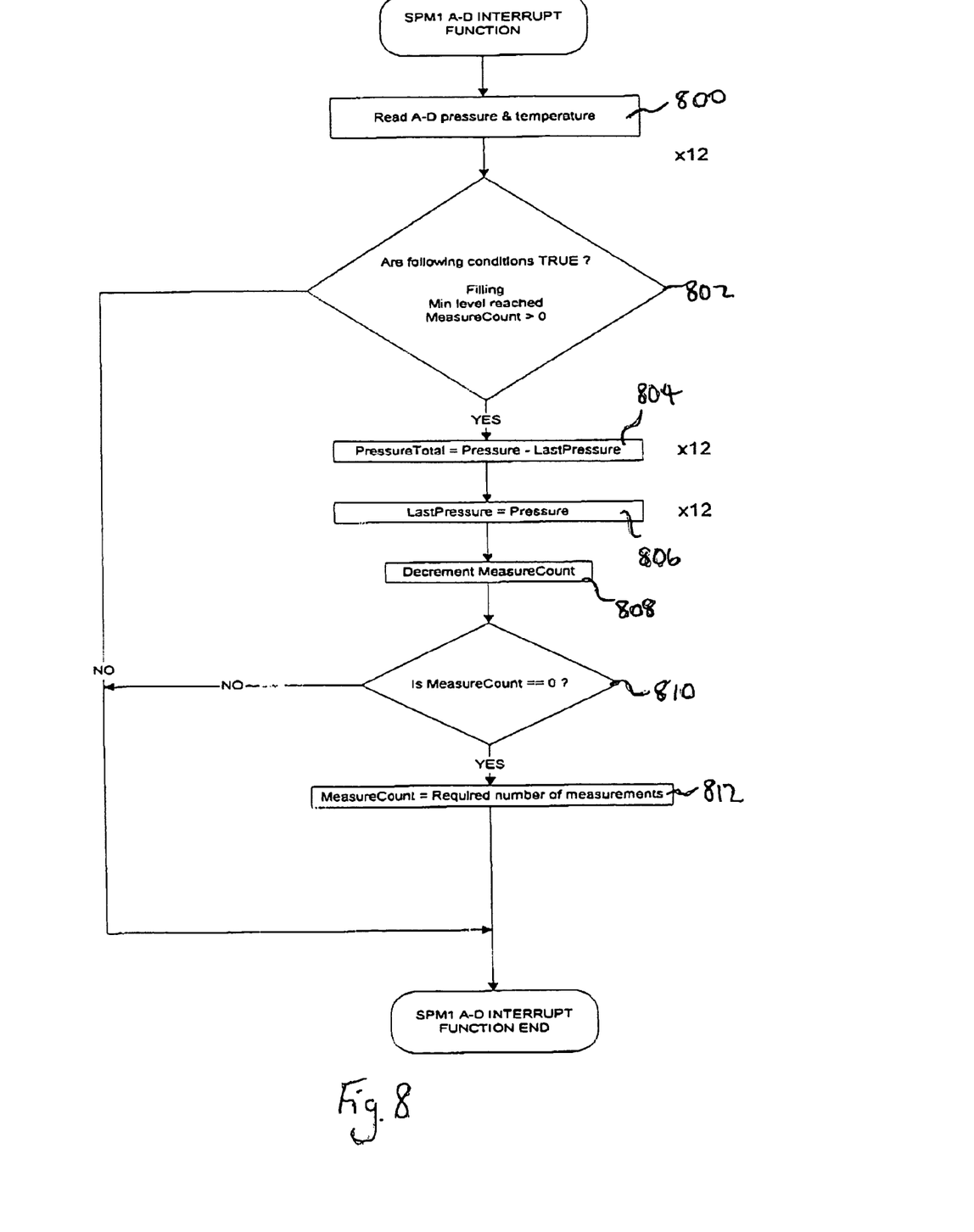
Figure 9:
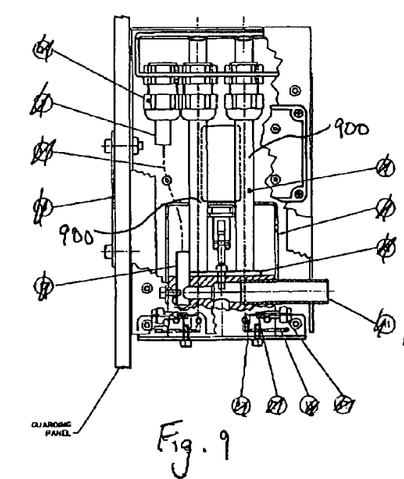
FIG. 9 shows an elevated part cross-sectional part cut-away diagram of a variant embodiment of the present invention.
Figure 10:
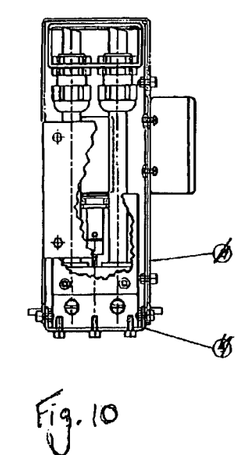
FIG. 10 shows a side part cut-away elevational view of the apparatus shown in FIG. 9.
Figure 11:
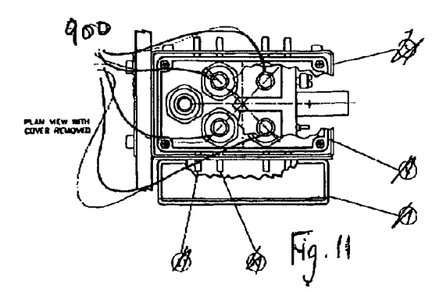
FIG. 11 shows a part cut-away plan view of the apparatus shown in FIG. 9.
Figure 12:
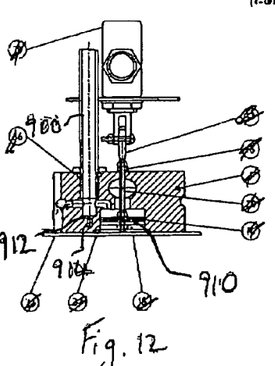
FIG. 12 shows an elevated axial sectional view of parts of the apparatus shown in FIG. 9.
Figures 13, 14:
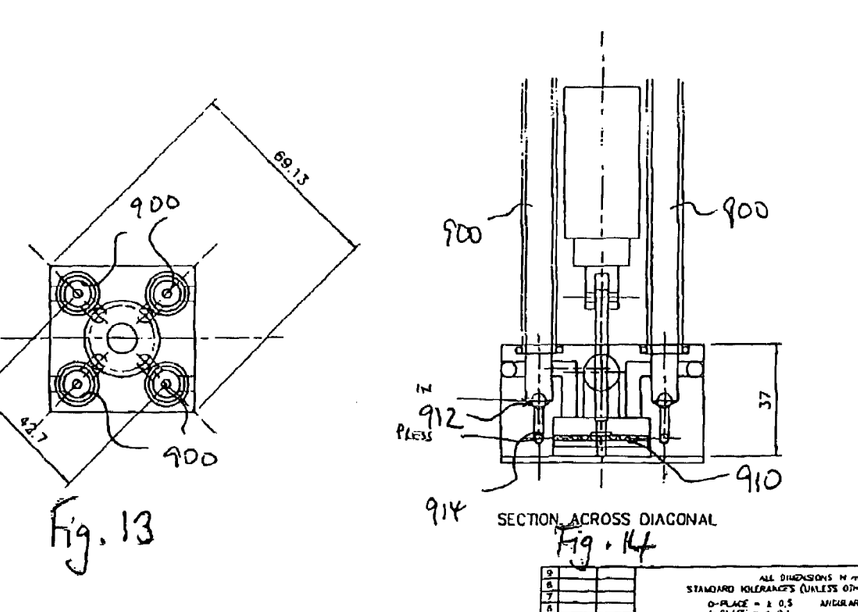
FIG. 13 shows a cross-sectional view through a part of the apparatus shown in FIG. 12.
FIG. 14 shows a diagonal diagrammatic cross-section of the apparatus shown in FIG. 9.
Figure 15:
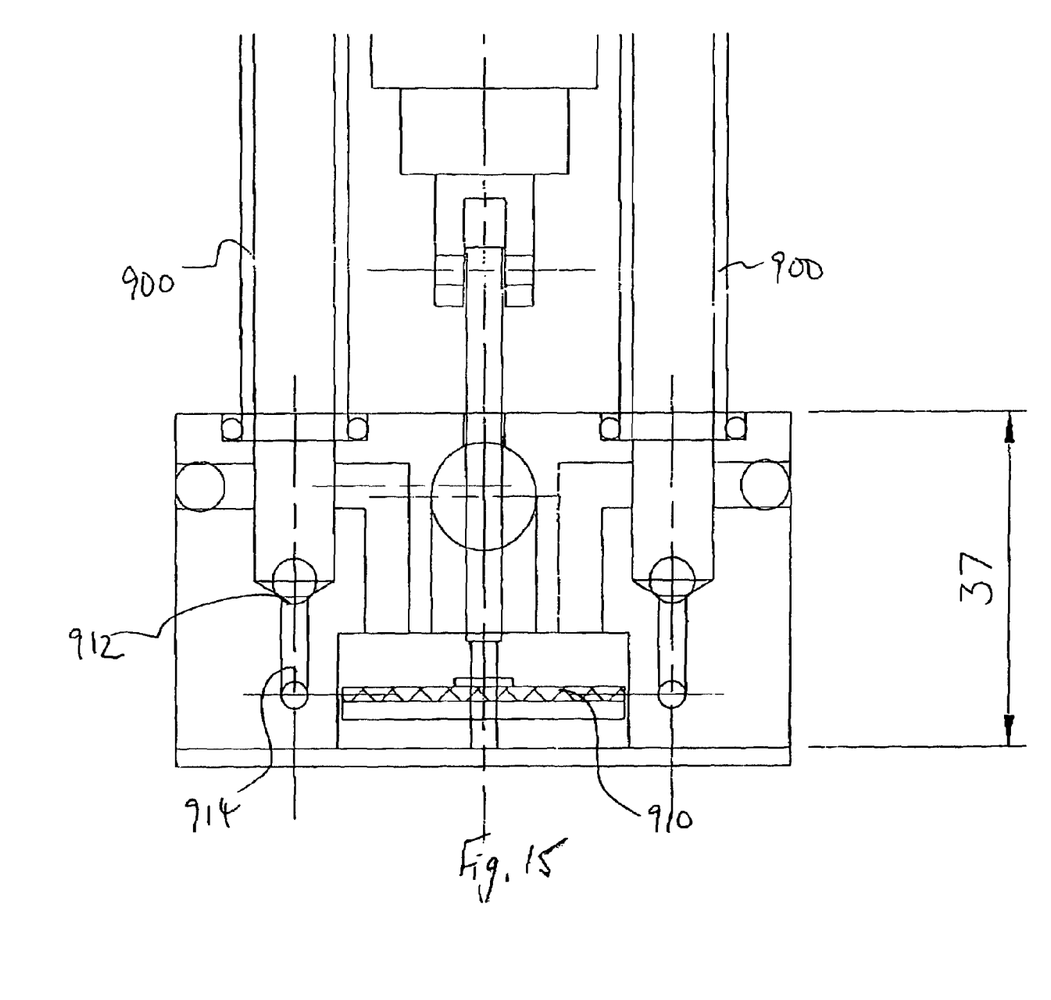
FIG. 15 shows the diagonal cross-section of FIG. 14 on a larger scale.

In the analogue to digital converter interrupt sub-routine shown in FIG. 8, readings are taken in series of the pressure and temperature from the analogue to digital converter 126 at step 800. This is executed for each of the twelve columns 12. Next, there follows a query at step 802 whether filling is occurring, whether the minimum level has been reached, and whether the measure count exceeds zero. The sub-routine is ended if any one of these conditions is 'false'. If they are all true, then for each of the twelve columns, the incremental pressure is calculated by the microprocessor 136 at step 804. At step 806, the value of the memorised last pressure is equated to the current pressure, and at step 808, the measure count is decremented. Next the query is raised at step 810 as to whether the level count has reached zero. If it is not, then the program returns to step 802. If it has, then the measure count has reached the required number of measurements and the sub-routine is completed.

From the incremental pressure the microprocessor 136 thus acts as a calculator which converts the output from the pressure transducer to value indicative of the increase in the volume of fluid above the transducer. Temperature corrections and wetted wall corrections as referred to herein are also effected by the microprocessor 136 at this stage. So can the averaging referred to herein also be effected.

The embodiment of the present invention shown in FIGS. 9 to 15 comprises four columns 900. They share a common drain valve 910 and are provided with respective thermocouples 912 and respective pressure transducers 914. Such a construction is less accurate than the one shown in FIGS. 1 to 4 but is nonetheless sufficiently accurate for example to measure the bypass flow through injectors which are electrically triggered, but which use the pressure of fluid supplied to the injector to power operation of the injection.

Other variations and modifications to the illustrated embodiments of the present invention may occur to the reader without taking the resulting construction outside the scope of the present invention.

We claim:

1. Fuel injector flow test metering apparatus comprising wall portions extending upward from a base portion to define an elongate generally upright cavity of substantially uniform cross-section and an inlet to the cavity to enable fluid which is to be metered to be fed into the cavity, wherein the inlet is located at the base portion of the cavity and the apparatus further comprises a pressure transducer at the base portion of the cavity which is in communication with said fluid in the cavity when the apparatus is in use, to provide a signal which is indicative of the amount of said fluid in the cavity above the transducer.

2. Metering apparatus according to claim 1, wherein the wall portions are provided by a tubular column.

3. Metering apparatus according to claim 2, wherein the column is made of glass.

4. Metering apparatus according to claim 2, wherein the column is made of steel.

5. Metering apparatus according to claim 4, wherein the column is made of stainless steel.

6. Metering apparatus according to claim 2, wherein the column is replaceable by a different column having a different cross-sectional area and a different height.

7. Metering apparatus according to claim 1, wherein the output from the pressure transducer is connected to a calculator which converts the output from the pressure transducer to a value indicative of the volume of fluid above the transducer.

8. Metering apparatus according to claim 7, wherein the calculator is programmed to allow for an exponentially decaying rate of flow down the cavity wall portions owing to fluid which has wetted those portions.

9. Metering apparatus according to claim 1, wherein the apparatus further comprises a temperature measuring device in communication with the fluid in the cavity when the apparatus is in use.

10. Metering apparatus according to claim 1, wherein the output from the pressure transducer is connected to a calculator which converts the output from the pressure transducer to a value indicative of the volume of fluid above the transducer, wherein the apparatus further comprises a temperature measuring device in communication with the fluid in the cavity when the apparatus is in use, and wherein the temperature measuring device is connected to the calculator to enable a temperature correction to be made.

11. Metering apparatus according to claim 1, wherein the calculator is programmed to convert the signal from the pressure transducer to one which is indicative of the volume of fluid in the cavity required to give such a reading with the temperature of the fluid being 40.degree. C.

12. Metering apparatus according to claim 9, wherein the temperature measuring device is a thermistor.

13. Metering apparatus according to claim 9, wherein the temperature measuring device is a thermocouple.

14. Metering apparatus according to claim 1, wherein the cavity is provided with an outlet and the outlet is provided with a drain valve to enable fluid to be drained from the cavity.

15. Metering apparatus according to claim 14, wherein the outlet is arranged at the base of the cavity to enable substantially the whole of the cavity to be drained of fluid.

16. Metering apparatus according to claim 1, further comprising at least one output line of an injector pump connected to feed fluid to the cavity via a fuel injector.

17. Metering apparatus according to claim 16, wherein the apparatus measures the output of fluid from the nozzle of the or each injector.

18. Metering apparatus according to claim 16, wherein the apparatus measures the bypass output from the or each injector.

19. Metering apparatus according to claim 17, wherein further such apparatus is provided to measure the bypass output from the injector.

20. Metering apparatus according to claim 16, wherein the metering apparatus has a separate cavity for each line of the injector pump which is to be tested.

21. Metering apparatus according to claim 20, wherein respective drain valves for the cavities are provided.

22. Metering apparatus according to claim 20, wherein a plurality of cavities share a drain valve.

23. Metering apparatus according to claim 10, wherein the calculator is provided with a measure of the height of the fluid in the cavity immediately prior to a drain, as well as the time taken between a drain and a given reading, as well as the temperature indicated by the temperature measuring device, and is programmed to provide a correction for wetted walls.

24. Metering apparatus according to claim 1, wherein a delay device is provided to ensure a steady state is reached after a drain before readings are taken.

25. Metering apparatus according to claim 24, wherein the delay device counts the number of injections that have been made since the last drain.

26. Metering apparatus according to claim 24, wherein the delay device ensures a fixed time delay after a drain before readings are commenced.

27. Metering apparatus according to claim 1, wherein memory means are included as part of the apparatus to maintain a tally of readings taken over a given period.

28. Metering apparatus according to claim 27, wherein the apparatus also includes averaging means to provide a measure of the average injected volume over a set of injections.

29. Metering apparatus according to claim 28, wherein the number in such a set of injections is substantially one hundred.

30. Metering apparatus according to claim 1, wherein the apparatus further comprises display apparatus connected to display the readings taken, for example in the form of histograms and/or numerical indications.

31. Metering apparatus according to claim 1, further comprising a readily available computer.

32. Metering apparatus according to claim 1, wherein the apparatus further comprises collector means to enable the collection of fluid from the cavity when it is drained, to facilitate a gravimetric calibration of the apparatus.

33. Metering apparatus according to claim 1, wherein the pressure transducer is coupled to a separate cavity which does not empty when the said generally upright cavity is drained.

* * * * *